United States Patent [19]

Gentleman et al.

[11] Patent Number: 4,527,872
[45] Date of Patent: Jul. 9, 1985

[54] COMPOSITE PROCESS CINEMATOGRAPHY SYSTEM AND METHOD

[76] Inventors: Wally Gentleman, 14144 Dickens St., Apt. 208, Sherman Oaks, Calif. 91423; John Eppolito, 1939 N. Los Robles, Pasadena, Calif. 91104

[21] Appl. No.: 500,859

[22] Filed: Jun. 3, 1983

[51] Int. Cl.³ ............................................. A63J 5/00
[52] U.S. Cl. ...................................... 352/89; 352/47
[58] Field of Search .................. 352/87, 89, 47, 50, 352/51, 52

[56] References Cited

U.S. PATENT DOCUMENTS

| | | | |
|---|---|---|---|
| 1,897,494 | 2/1933 | Mitchell et al. | 355/77 |
| 1,959,498 | 5/1934 | Planskoy | 352/89 |
| 2,174,931 | 10/1939 | Terry et al. | 352/87 |
| 2,257,551 | 9/1941 | Griffin et al. | 352/89 |
| 2,727,427 | 12/1955 | Jenkins | 352/89 |
| 2,729,141 | 1/1956 | Walker | 352/89 |
| 2,821,105 | 1/1958 | Walker | 355/39 |
| 3,867,022 | 2/1975 | Whatley et al. | 352/87 |
| 4,035,067 | 7/1977 | Whatley et al. | 352/89 |
| 4,150,883 | 4/1979 | Whatley et al. | 352/89 |

Primary Examiner—Monroe H. Hayes
Attorney, Agent, or Firm—Warren B. Kice; Thomas L. Cantrell; Stanley R. Moore

[57] ABSTRACT

A composite cinematography system and method in which two identical images are projected towards two separate reflective screens, respectively, with a camera being disposed in the reflective path of one of the screens. The reflection from the other screen is directed into the reflective path and masking means are provided for masking selected complimentary portions of the images on both of the reflecting means to create a special effect. A lens system is provided which forms a reduced focused image of at least one of the images at a location along its respective reflective path and means are disposed in the latter reflective path approximate to the reduced focused image for superimposing an additional image onto the reduced focused image to form a composite image for photographing by the camera.

24 Claims, 7 Drawing Figures

COMPOSITE PROCESS CINEMATOGRAPHY SYSTEM AND METHOD

BACKGROUND OF THE INVENTION

This invention relates to a composite process cinematography system and method and more particularly to such a system and method which combines the features of projection cinematography and reduced focused imaging.

Process cinematography in general involves the technique of front or dual projection of images onto single or dual reflective screens, respectively. In front projection, an image of a background scene, or the like, is projected, via an angled mirror, onto a screen extending behind an actor to create the illusion that the actor is a part of the scene.

In the dual projection process, a screen is aligned to face the camera and a side screen disposed at a 90° angle to the front screen. An image projected through a semi-reflective, semi-transparent, mirror or window extending at 45° to both screens is reflected and passed to both screens, and the use of mattes or countermattes disposed adjacent the screens enables an apparent depth perception to occur so that, for example, an actor can appear to walk behind an object, such as a building, projected on the screens.

These techniques were less than perfect since, for example, in the dual projection process, the mattes and countermattes require great accuracy in positional alignment and their edges required the tedious application of masking material to obtain an accurate matte blend. Also, the system required a doubling of studio space to accommodate two simultaneous projection throws, and the projector light output was not sufficiently intense to accommodate large reflective screens.

Several improvements have since evolved. For example, the size of the side screen was reduced by utilizing a field lens between the latter screen and the countermatte. Also, the restrictions of the matte outline adjustments were overcome by utilizing compatible glass sheets on which were delineated the required shapes for the matte and countermatte so that the blend of the interlocking mattes could be viewed through the camera and adjusted through hand-drawn additions and removals of black masking paint applied to the matte glasses.

However, these techniques still required the utilization of a large glass matte for the front screen and, in addition, required that the latter matte be a substantial distance (up to 20 feet) from the camera, entailing much footwork and time delays between setups. Also, it was difficult, if not impossible, to create any effects that would be otherwise possible if the mattes and countermattes could be occluded, or moved, at a rapid rate.

Also, these types of techniques required light intensity and color correction devices since the light reflected from the smaller side screen is at much greater intensity than the principle screen.

SUMMARY OF THE INVENTION

It is therefore an object of the present invention to provide a composite process cinematography system and method in which front or dual projection techniques are utilized in connection with reduced focused imaging to provide improved flexibility and results.

It is a further object of the present invention to provide a system and method of the above type in which additional images or models can be placed in the optical path of the camera to add to the special effects.

It is a still further object of the present invention to provide a composite process cinematography system and method which permits a dual projection cinematography technique to be utilized while using mattes and countermattes of a relatively small size.

Toward the fulfillment of these and other objects, according to one embodiment of the system and method of the present invention two identical images are projected towards two separate reflective screens, respectively, with a camera being disposed in the reflective path of one of the screens. The reflection from the other screen is directed into the reflective path, and mattes are provided for masking selected complimentary portions of the images from both of the screens to create a special effect. A lens system is provided for forming a reduced focused image of at least one of the images at a location along its respective reflective path and means are disposed in the latter reflective path approximate to the reduced focused image for superimposing an additional image or model onto the reduced focused image to form a composite image for photographing by said camera.

According to another embodiment a single screen is utilized onto which an image is projected, and a reduced focused image is formed along the reflective path of the screen, so that an additional image or model can be superimposed onto the reduced focused image.

BRIEF DESCRIPTION OF THE DRAWINGS

The above brief description, as well as further objects, features and advantages of the present invention will be more fully appreciated by reference to the following detailed description of the present preferred but nonetheless illustrative embodiment in accordance with the present invention when taken in conjunction with the accompanying drawings in which.

DESCRIPTION OF THE PREFERRED EMBODIMENTS

Figure 1:
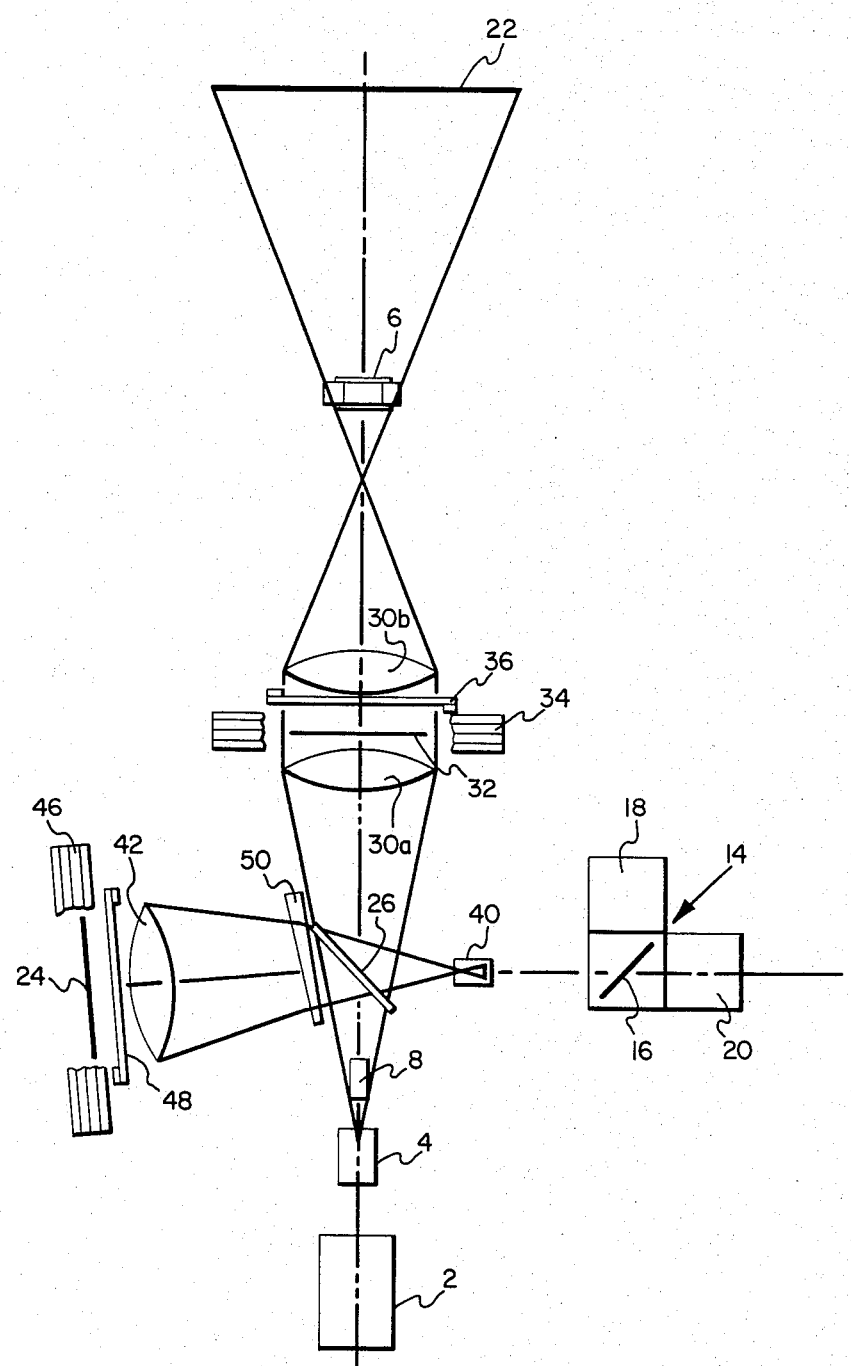
FIG. 1 is a schematic view depicting the system utilized in the present invention.

Referring specifically to FIG. 1 of the drawings, the reference numeral 2 refers in general to a motion picture camera which is mounted for rotational and translational movement in three planes as will be described in detail later and which cooperates with a prime lens 4 disposed adjacent to, and along the optical axis of, the camera and a secondary imaging lens 6 disposed along the optical axis of the camera and in a spaced relation to the lens 4. An inverting prism 8 is disposed between the lenses 4 and 6 for reasons to be described later.

A projector, shown in general by the reference numeral 14, is provided whose optical axis extends at a 90° angle to that of the camera 2 and includes a half-mirror shutter 16 cooperating with duel gates 18 and 20 to provide for flicker-free projection in a conventional manner.

A front screen 22 is provided along the optical axis of the camera 2, and a side screen 24 is provided along the optical axis of the projector 14 and thus is displaced 90° from the front screen.

A semi-transparent, semi-reflective beam splitter plate 26 is provided along the optical axis of the camera 2 and the projector 14 and extends at a 45° angle to each. The plate 26 is constructed and arranged in a conventional manner so that its front surface reflects a predetermined portion of the light introduced thereto to the front screen 22 and passes the remaining portion to the side screen 24.

The front screen 22 can be fabricated with a highly reflective material such as "Scotchlight", which is well known in the industry. The side screen may be of a similar material or, alternately, in the form of a white calcite block, or the like, so that most of the unwanted light is absorbed.

As a result of this arrangement, a portion of the source light, or image, from the projector 14 is reflected, via the reflective surface of the plate 26, onto the front screen 22, while the remaining portion is passed through the latter plate to the side screen 24. Thus, an identical image is reflected from the screens 22 and 24 back along their reflective paths. The reflective path from the front screen 22 coincides with the optical axis of the camera 2 so that the image reflected from the front screen 22 is directed along the optical axis of the camera 2 and towards the camera, while the reflected image from the side screen 24 is reflected by the back reflective surface of the plate 26 onto the optical axis of the camera 2 and towards the latter camera. Thus the camera 2 "sees" both images from the screens 22 and 24.

A reduced focused imaging lens system, in the form of an aerial imaging lens system, is disposed along the optical axis of the camera 2 between the front screen 22 and the plate 26, and consists of two spaced condenser lenses 30a and 30b extending between the prime lens 4 and the secondary imaging lens 6 to form an aerial image plane 32.

The reference numeral 34 refers in general to a frame support which extends in the aerial imaging plane 32 for supporting photographs, diapositives, graphics, transparencies, models or the like. The support 34 is shown partially in FIG. 1 and will be described in greater detail later. A primary matte 36 extends between the lens 30b and the aerial imaging plane 32 and will also be described in detail later.

A projector lens 40 and a condenser lens 42 are disposed along the optical axis of the projector 14. The condenser lens 42 functions to form a reduced image at the screen 24 of the image passed by the plate 26. A frame support 46 extends underneath (as will be better shown later) the screen 24 and a countermatte 48 extends between the lens 42 and the screen 24.

An optical wedge 50 is disposed adjacent the plate 26 for deflecting the light ray path from the latter plate to eliminate interface reflections of the source light from the projector 14 to the screen 24.

It is understood that components for providing color hue and proper illumination and for correcting for aberrations may be provided along the optical axes of the camera 2 and the projector 14 as needed, but are not shown in the drawings for the convenience of presentation.

According to the foregoing, approximately 50% of the image projected from the projector 14 is reflected onto the front screen 22 via the reflective portion of the plate 26, and is passed onto the side screen 24 via the transmittive portion of the plate 26. The matte 36 and the countermatte 48 can be used to selectively mask out portions of the reflected image from the front screen 26 and complimentary portions of the reflected image from the side screen 24 to obtain the effect of depth.

Light reflected from the screen 22 passes through the aerial imaging plane 32 and is collected by the prime lens 4. The camera 2 is "focused" on the aerial imaging plane 32 which is a reduced size compared to the screen 22. Since the image at the aerial imaging plane 32 is inverted by the condenser lenses 30a and 30b, the prism 8 functions to re-invert the image. The camera 2 is also focused on the screen 24 as a result of the reflected image from the latter screen being reflected towards the camera by the back reflective surface of the plate 26.

Since the matte 36 and the countermatte 48 are located proximate to the aerial imaging plane 32 and to the screen 24, respectively, they can be much smaller in size than would otherwise be possible, thus permitting synchronous movement therebetween as will be described latter. Also, additional images or models can be supported on the frame supports 34 and 46 to further add to the composite image reflected towards the camera 10. For example, photographs, diapositives, graphics, transparencies, and micro-models, such as those manufactured by known photographic etching processes, can be placed in the frame supports 34 and 46 as needed. As a result an infinite combination of special effects can be created for photographing by the camera 2.

Figure 2A:
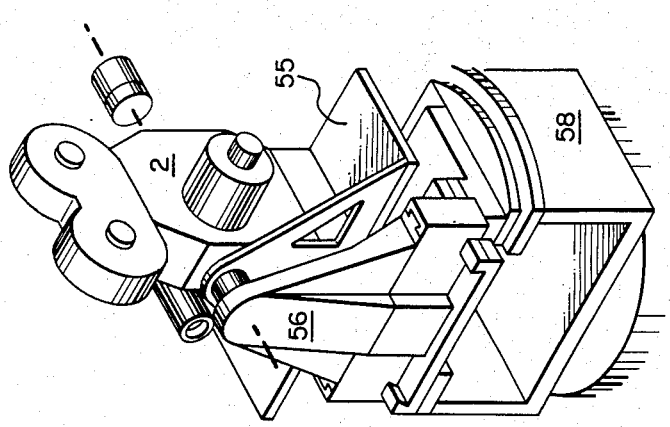
FIG. 2 is a partial isometric view of the system of FIG. 1.
Figure 2:
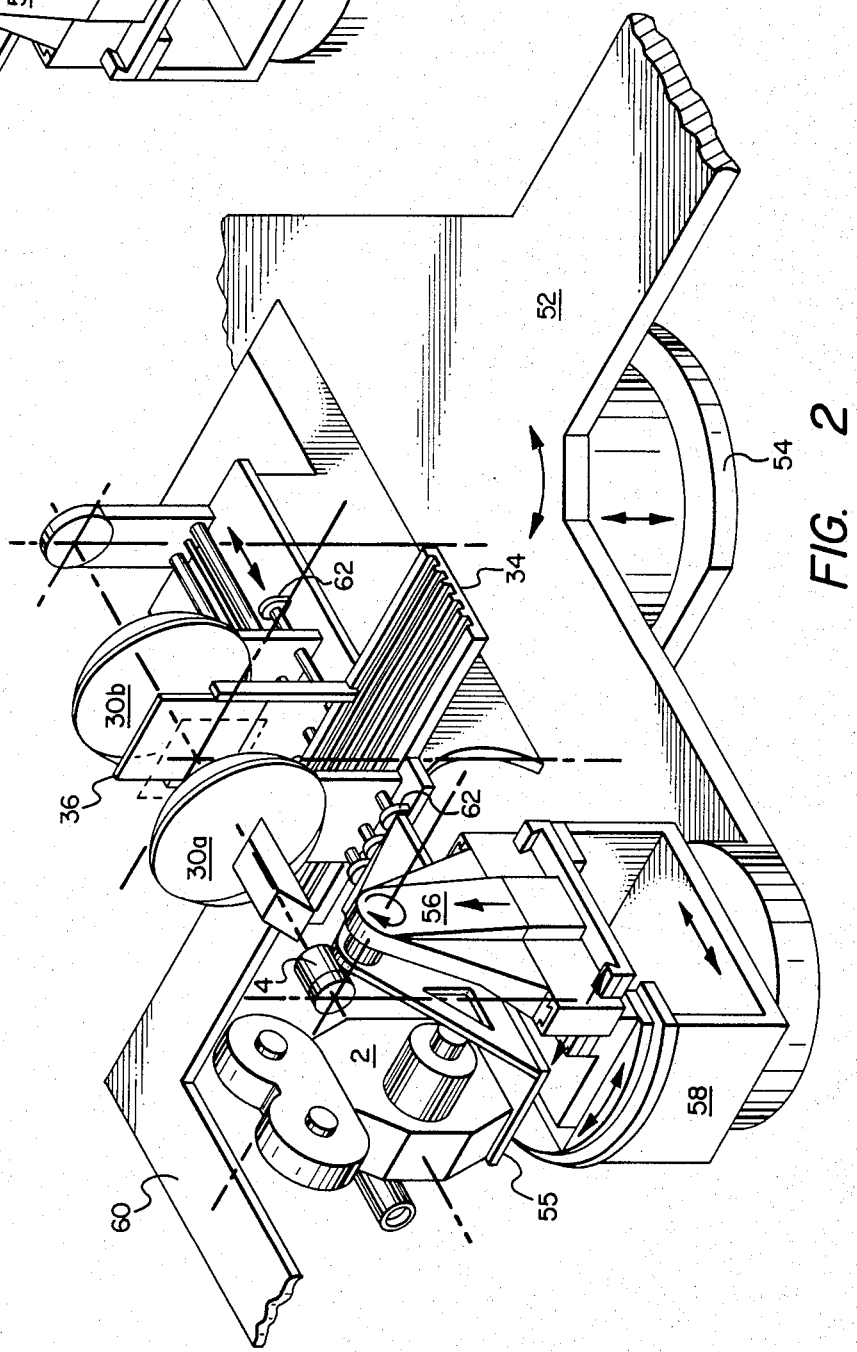

FIG. 2 of the drawings depict selected portions of the components just described mounted on a platform 52, which is adapted for reciprocal vertical movement and rotational movement relative to a support 54. The camera 2, in turn, is supported on a bracket 55 which is mounted for tilting movement relative to a support bracket 56 so that it can tilt about the nodal point of the lens 4. The support bracket 56 is adapted for vertical movement relative to a swivel base 58 which is mounted for rotational movement on the platform 52.

A sub-platform 60 is mounted to the platform 52 and supports the lens 4, 6, 30a, and 30b, the matte 36 and includes the frame support 34. Several components, including the plate 26, which are supported independently on the platform 52, as well as the lens 42 and the countermatte 48, which are supported on the platform 60, have not been shown for the convenience of presentation. It is understood that the sub-platform 60 can be connected to a motorized occluding mechanism including a plurality of stepper motors 62 and to a computerized motion-repeat system (not shown) to effect vertical and horizontal movement and circular rotation to permit multi-wipe action of program synchronicity.

It is further understood that the entire assembly shown in FIG. 2 can be mounted on rails, or the like, for forward and backward movement and that a plurality of wheeled, hydraulically operated platforms can be associated with the first screen 22 to permit actors to move relative to the images on the screen. Also, a trembler assembly can be associated with the side screen 24 to diffuse the texture of the screen.

As a result of the above, and further due to the fact that the camera 2 can be repositioned on the bracket 55 as needed, it can be appreciated that the camera can be located relative to the other components in an infinite number of positions. For example, FIG. 2a depicts another position of the camera 2 as a result of it being moved 90° in the bracket 55 and as a result of the swivel base 58 being rotated 90° relative to the platform 52. As another example, the camera 2 could be turned upside down by rotating the bracket 55 180°, thus eliminating the need for the inverting prism 8.

Since the embodiments of FIGS. 3-6 contain the same components as those of the previous embodiment, these components will be given the same reference numeral.

Figure 3:
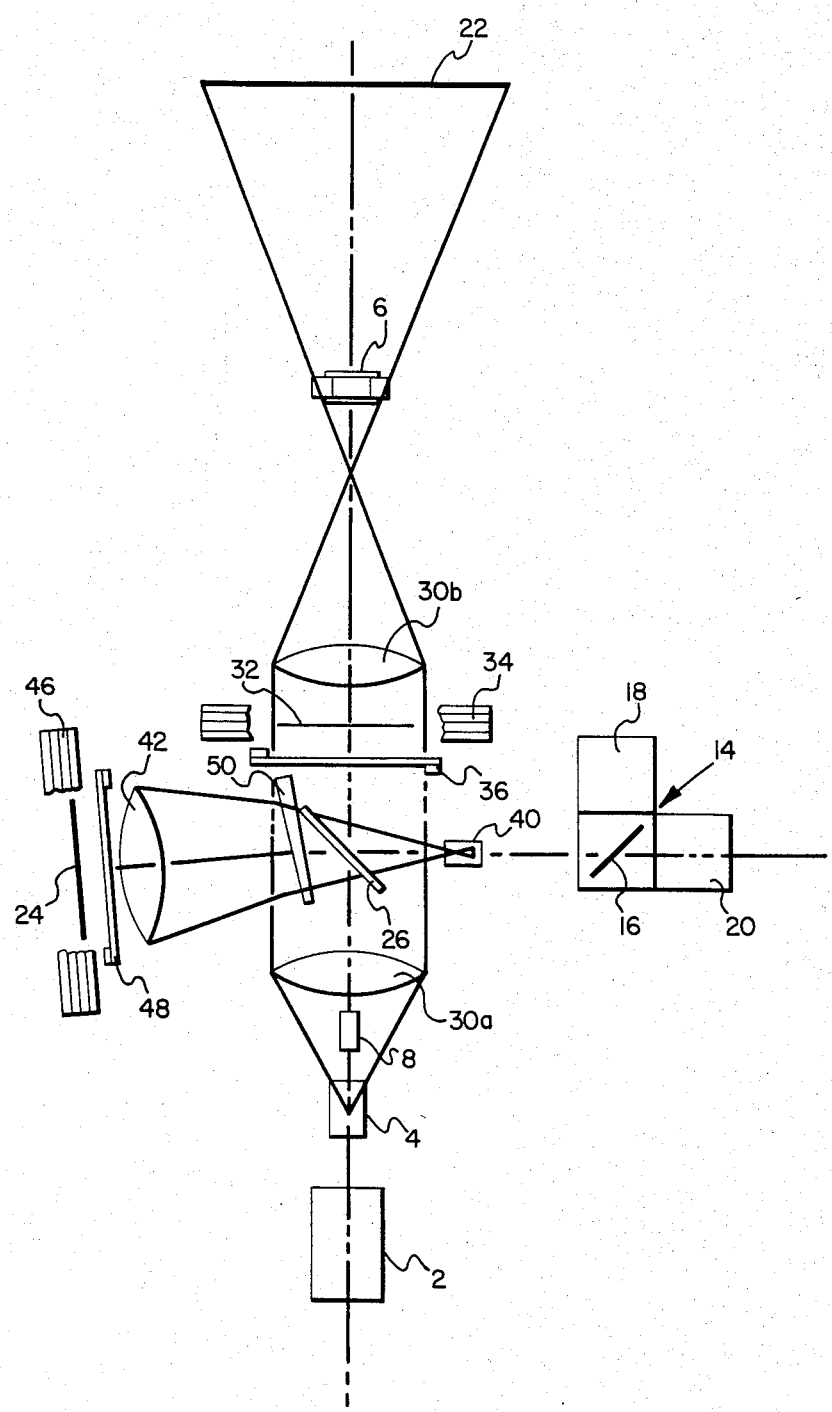
FIGS. 3–6 are views similar to FIG. 1 but depicting alternate embodiments of the present invention.

According to the embodiment of FIG. 3, the optical axis of the projector 14 along with the screen 24, the plate 26, the lenses 40 and 42, the frame support 46, the countermatte 48, and the wedge 50 are disposed between the lens 30a and the lens 30b. As a result, the aerial imaging plane 32 lies between the plate 26 and the lens 30b. As in the previous embodiment, the camera 2 is focused on the aerial imaging plane 32 and the reflections from the screen 22 is passed through the latter plane and to the prime lens 4, while the reflection from the screen 24 is reflected off the back surface of the plate 26 to the latter lens.

Figure 4:
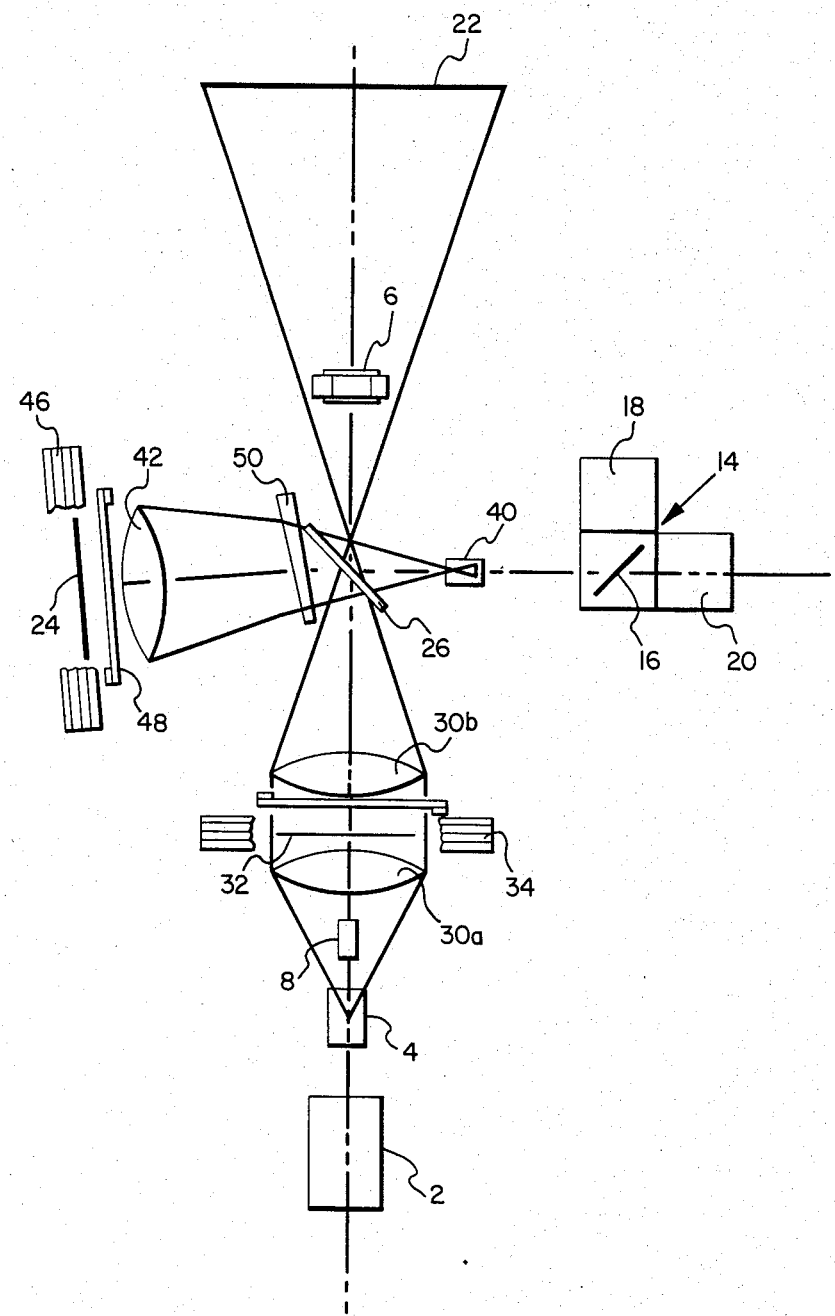

According to the embodiment of FIG. 4, the optical axis of the projector 14, and therefore the above-mentioned components disposed along its axis, are disposed between the condenser lens 30b and the secondary imaging lens 6. The aerial imaging plane 32 lies between the two lens 30a and 30b as in the embodiment of FIG. 1, but much closer to the camera 2. As in the previous embodiment, reflections from the screen 24 are reflected off the back face of the plate 26, through the aerial imaging plane 32 and to the lens 4.

Figure 5:
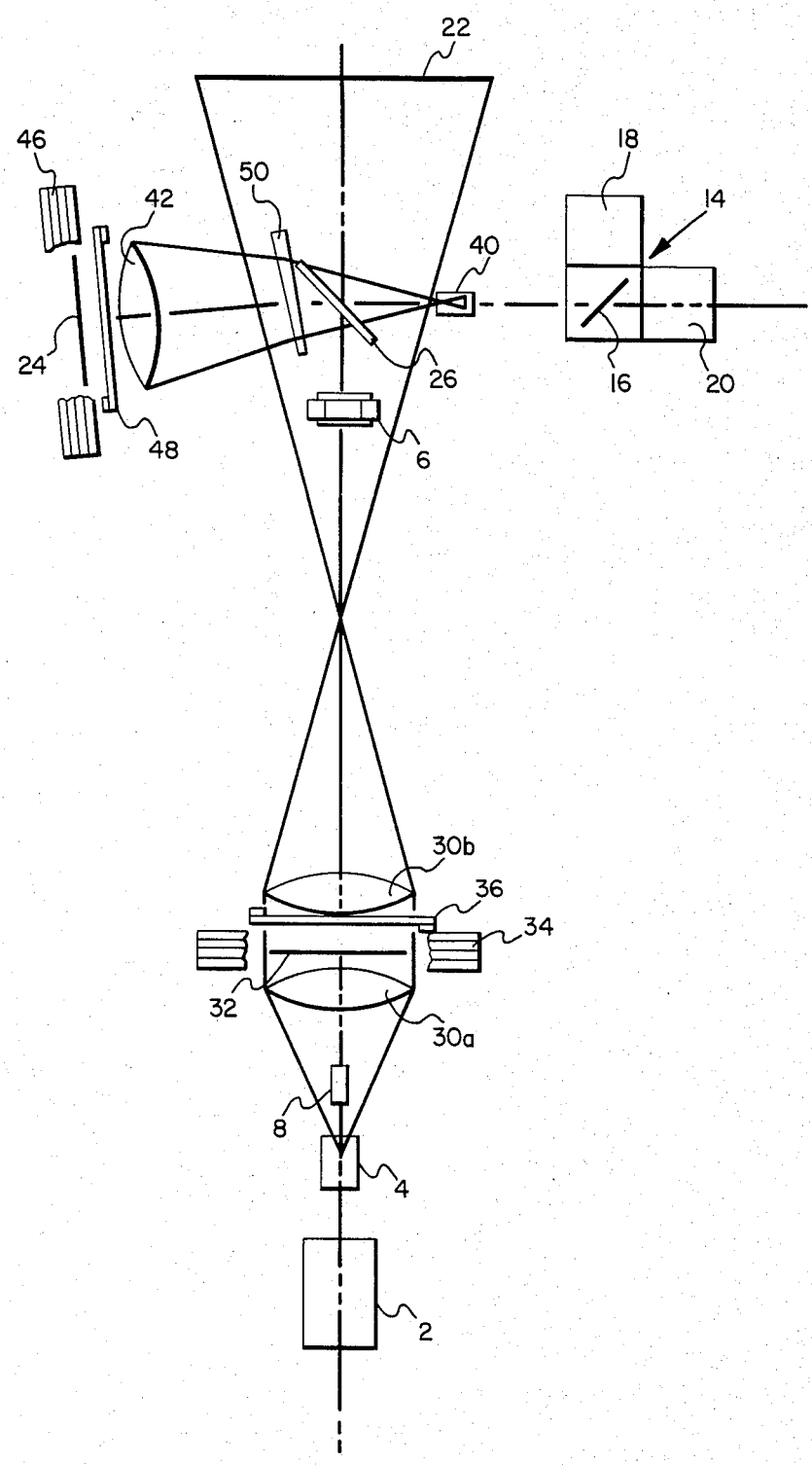

According to the embodiment of FIG. 5, the optical axis of the projector 14, along with the associated components discussed above, are disposed between the secondary imaging lens 6 and the screen 22. The aerial imaging plane 32 is thus formed between the lens 6 and the camera 2 and, as in the previous embodiment, the reflections from the screen is reflected, via the back surface of the plate 26 towards the prime lens 4.

Figure 6:
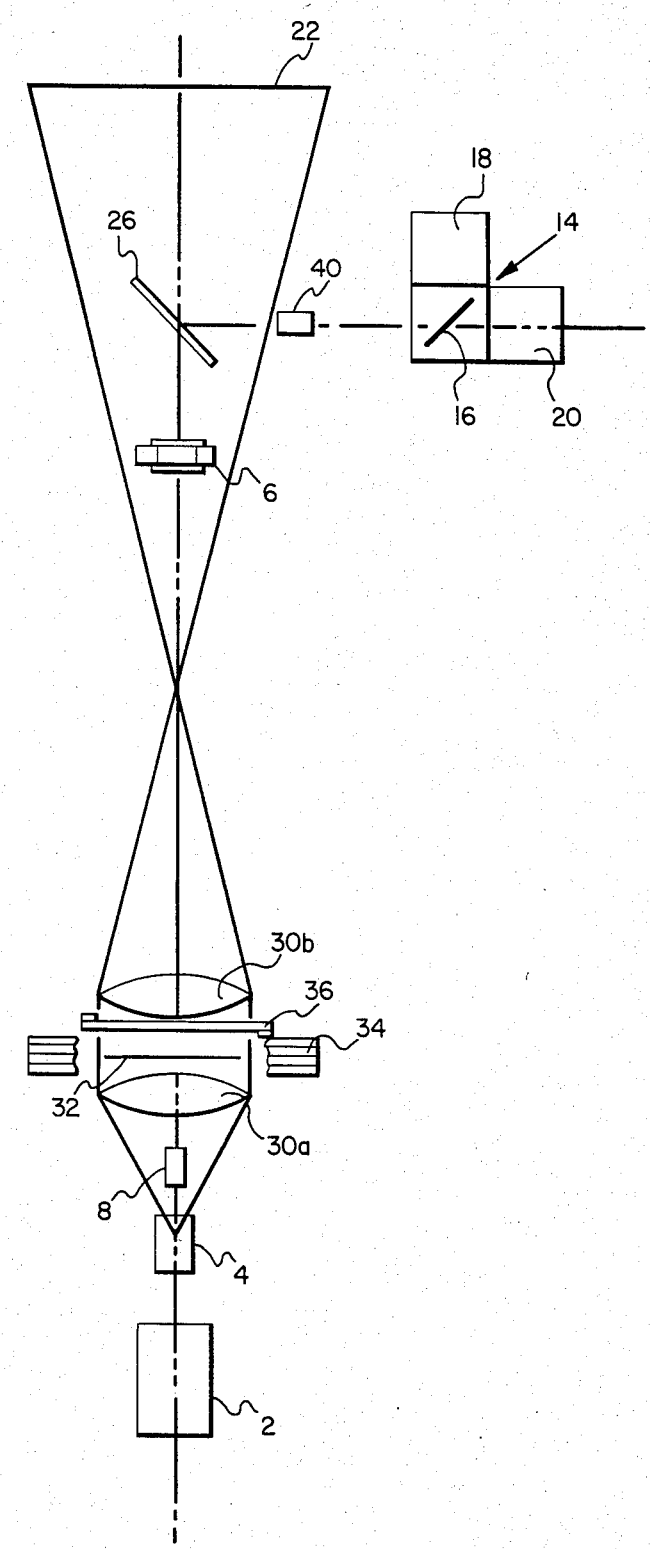

According to the embodiment of FIG. 6, the screen 24 and its associated components, including the lens 42, the countermatte 48, the frame support 46, and the wedge 50 are eliminated, and the image from the projector 14 reflected off of the plate 26 is "front projected" onto the front screen 22. A reduced aerial image of the reflected image from the screen 22 is produced by the lens 30a and 30b at the plane 32 between the prime lens 4 and the secondary imaging lens 6. As in the previous embodiment additional images or models can be disposed at the reduced aerial imaging plane 32, and the primary matte 36 can be used to mask selected portions of the reduced image adjacent the plane 32 for photographing by the camera.

It is thus seen that, according to the present invention, a front or dual projection cinematography technique can be utilized while additional images of relatively small size can be placed, and easily interchanged, at the reduced focused image planes to add to the special effects. Also, the dual projection technique can utilize mattes and countermattes of a relatively small size which can be easily handled, modified and moved to further add to the special effects.

Other modifications, changes, and substitutions are intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. A composite cinematography system comprising reflective screen means; means including a projector for directing an image towards said reflective screen means; camera means having its optic axis disposed in the reflective path of said reflective screen means; focusing lens means for focusing the reflected image from said reflective screen means to a plane disposed in said reflective path and along said optic axis; two spaced lenses disposed in said reflective path, along said optic axis, and to either side of said plane for providing a reduced aerial image of said reflected image at said plane; and object supporting means disposed in said reflective path, along said optic axis, and between said spaced lenses for supporting an object adjacent said plane to form a composite image for photographing by said camera means.

2. The system of claim 1 wherein said focusing lens is located in said reflective path and along said optic axis.

3. The system of claim 1 further comprising means for providing movement of said camera means relative to said lens means and relative to said reflective screen means in two planes.

4. The system of claim 1 wherein said object supporting means comprises a frame support.

5. The system of claim 1 wherein said directing means further includes a reflective plate for reflecting the image from said projector onto said reflective screen means.

6. The system of claim 1 wherein said focusing lens means is located between said reflective screen means and said two spaced lenses.

7. A composite cinematography system comprising reflective screen means; means including a projector for directing an image towards said reflective screen means; camera means having its optic axis disposed in the reflective path of said reflective screen means; focusing lens means for focusing the reflected image from said reflective screen means to a plane disposed in said reflective path and along said optic axis; two spaced lenses disposed in said reflective path, along said optic axis and to either side of said plane for providing a reduced aerial image of said reflected image at said plane; means disposed in said reflective path, along said optic axis and between said spaced lenses for masking selected portions of said reflected image adjacent said plane; second reflective screen means disposed out of said reflective path; means for directing said image towards said second reflective screen means; and means for reflecting the image from said second reflective screen means into said reflective path and along said optic axis to form a composite image for photographing by said camera.

8. The system of claim 7 further comprising means disposed in said reflective path, along said optic axis, and between said spaced lenses for adding an additional image adjacent said reduced aerial image for photographing by said camera means.

9. The system of claim 8 wherein said means for adding an additional image comprises a frame support for supporting an object.

10. The system of claim 7 wherein said focusing lens is located in said reflective path and along said optic axis.

11. The system of claim 7 further comprising means for providing movement of said camera means relative to said lens means and relative to said reflective screen means in two planes.

12. The system of claim 7 wherein said directing means further includes a reflective plate for reflecting the image from said projector onto said reflective screen means.

13. The system of claim 7 wherein said focusing lens means is located between said first reflective screen means and said two spaced lenses.

14. The system of claim 7 wherein said masking means masks selected portions of said reduced aerial image.

15. The system of claim 7 further comprising means for providing movement of said masking means relative to said camera and to said first reflective means.

16. The system of claim 7 further comprising means for providing movement of said second reflective screen means relative to said camera and to said first reflective screen means.

17. The system of claim 7 further comprising means for masking selected portions of said image from said second reflective screen means which are complimentary to the masked portions of the image from said first reflective screen means.

18. The system of claim 17 further comprising additional lens means for forming a reduced image of the image directed towards said second reflective screen means which latter reduced image is the same size as said reduced aerial image.

19. The system of claim 18 wherein said masking means are located proximate their respective reduced images and mask complimentary portions of said reduced images.

20. The system of claim 7 wherein said directing means further comprises a semi-transparent, semi-reflective plate for reflecting and passing the image from said projector onto said first and second reflective screen means, respectively, and for reflecting the reflected image from said second reflective screen means into said reflective path and along said optic axis.

21. The system of claim 20 wherein said plane is located between said reflective plate and said focusing lens means.

22. The system of claim 20 wherein said plane is located between said reflective plate and one of said two spaced lenses.

23. The system of claim 20 wherein said plane is located between said reflective plate and said camera.

24. The system of claim 7 wherein said plane is located between said first reflective screen means and said focusing lens means.

* * * * *